United States Patent
Tan et al.

(10) Patent No.: US 9,652,057 B2
(45) Date of Patent: May 16, 2017

(54) TOP MOUNT CLICKPAD MODULE FOR BI-LEVEL BASIN

(71) Applicants: Yeh-Cheng Tan, San Jose, CA (US); Po-Yu Lin, San Jose, CA (US)

(72) Inventors: Yeh-Cheng Tan, San Jose, CA (US); Po-Yu Lin, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/588,045

(22) Filed: Dec. 31, 2014

(65) Prior Publication Data

US 2016/0188020 A1    Jun. 30, 2016

(51) Int. Cl.
| | |
|---|---|
| G06F 3/0354 | (2013.01) |
| G06F 3/041 | (2006.01) |
| G06F 3/044 | (2006.01) |
| G06F 1/16 | (2006.01) |
| G06F 1/18 | (2006.01) |

(52) U.S. Cl.
CPC ......... *G06F 3/03547* (2013.01); *G06F 3/044* (2013.01); *G06F 1/183* (2013.01)

(58) Field of Classification Search
CPC ............. G06F 3/03547; G06F 3/04886; G06F 1/1616; G06F 1/169; G06F 3/041; G06F 3/044; G06F 2203/04105; G06F 1/1626; G06F 3/0395; H01H 13/85; H03K 17/9622; H03K 2217/960745; H03K 2217/960755
USPC .................................. 345/168, 169, 173–174
See application file for complete search history.

(56) References Cited

U.S. PATENT DOCUMENTS

| | | | | |
|---|---|---|---|---|
| 6,281,887 B1* | 8/2001 | Wang | ................... | G06F 3/03547 345/173 |
| 2007/0139388 A1* | 6/2007 | Lee | ................ | G06F 1/1616 345/173 |
| 2007/0205986 A1* | 9/2007 | Kim | ................ | H01H 13/705 345/168 |
| 2008/0309638 A1* | 12/2008 | Tatehata | ................ | G06F 3/0202 345/173 |
| 2009/0184932 A1* | 7/2009 | Alten | ................ | G06F 13/409 345/173 |
| 2010/0103611 A1* | 4/2010 | Yang | ................ | G06F 1/1616 361/679.55 |
| 2012/0020045 A1* | 1/2012 | Tanase | ................ | H01H 13/85 361/807 |
| 2013/0161173 A1* | 6/2013 | Chen | ................ | H01H 3/122 200/5 A |
| 2013/0234938 A1* | 9/2013 | Xue | ................ | G06F 1/169 345/158 |
| 2014/0035866 A1* | 2/2014 | Tan | ................ | G06F 3/044 345/174 |

(Continued)

*Primary Examiner* — Hong Zhou
(74) *Attorney, Agent, or Firm* — Osha Liang LLP (57) ABSTRACT

An input device for use with an electronic system. The input device includes: a substantially planar input surface comprising a capacitive sensor layer configured to sense positional information for an input object, the input surface having a first zone and a second zone, wherein the second zone is configured to deflect in response to force applied to the second zone by the input object; a stiffener substrate having a first portion affixed to a bottom surface of the first zone, and at least one finger extending parallel to and spaced apart from the second zone; and an actuation mechanism disposed between the finger and the second zone.

20 Claims, 6 Drawing Sheets

(56) References Cited

U.S. PATENT DOCUMENTS

2014/0267149 A1\* 9/2014 Oshita .................... G06F 3/044
 345/174
2014/0293157 A1\* 10/2014 Hoshi .................... G06F 1/169
 349/12

\* cited by examiner

TOP MOUNT CLICKPAD MODULE FOR BI-LEVEL BASIN

TECHNICAL FIELD

The present invention generally relates to input devices for electronic systems, and more particularly to click pads for determining positional and force information for input objects.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide user interfaces for the electronic system. For example, proximity sensor devices are often used as input devices for larger computing systems (such as opaque touchpads integrated in, or peripheral to, notebook, laptop, and tablet computers). Proximity sensor devices are also often used in smaller computing systems (such as touch screens integrated in cellular phones).

Some input devices also have the ability to detect force applied to a sensing surface in addition to determining positional information. Both hinged and uniform clickable pads typically employ a mechanical or electronic switch, such as a rubber or metal domed tact switch, to detect a button click, as well as a spring mechanism to restore the pressed surface to its nominal position following a button click.

Presently known clickable input pads are limited in that the area designated for button clicks tends to limit the area available for proximity sensing. In addition, the rigidity of the keyboard deck into which the click pad is mounted is reduced by the presence of the hole through which the pad is mounted to the keyboard deck. Moreover, a supplemental stiffening layer is typically needed to support the cyclic bending and restoration of glass reinforced epoxy laminate (FR4) or polyethylene terephthalate (PET) circuit boards used in presently known input devices, which increases the cost and complexity of the devices. Devices and methods are thus needed which overcome these shortcomings.

BRIEF SUMMARY

Various embodiments of the present invention provide a device and method that facilitate improved device usability. Specifically, the device and method provide improved user interface functionality by facilitating user input with input objects using a click pad module having a deflectable button zone and which may be installed into a bi-level basin formed within a keyboard deck of an electronic system.

According to various embodiments, a hinged input device is capable of simulating a button click. The button click, particularly when combined with the positional information, may be used to provide a wide range of user interface functionality and flexibility.

BRIEF DESCRIPTION OF DRAWINGS

Preferred exemplary embodiments will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides input devices and methods that facilitate improved usability by providing an improved click pad which simulates a button press when the input pad surface is deflected downwardly by an input object.

Various embodiments provide an input device having an input surface comprising a capacitive sensor layer configured to sense positional information for an input object over a first zone and a second zone, where the second zone is configured to deflect in response to applied force. A stiffener substrate includes a first portion affixed to a bottom surface of the first zone, and at least one finger extending parallel to and spaced apart from the second zone. A dome or tact switch is disposed between the finger and the second zone for detecting button presses.

Figure 1:
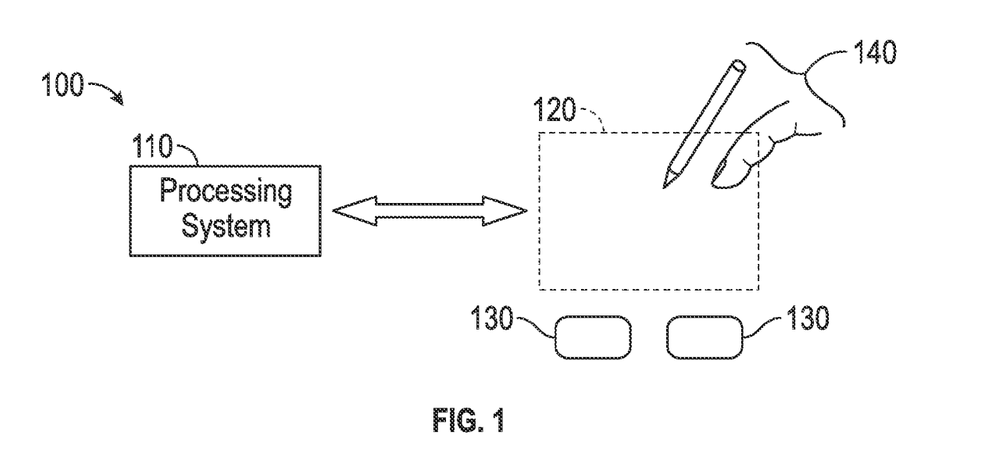
FIG. 1 is a block diagram of an exemplary electronic system that includes an input device and a processing system in accordance with an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad" or "touch sensor device") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region.

Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In various embodiments, the input device further comprises one or more force sensors as part of an interface for an electronic system. The input device has a processing system, an input surface, sensing region and a single or multiple force sensors implemented proximate the sensing region. Furthermore, it should be noted that one or more force sensors may be provided inside or outside the perimeter of the input surface. The input device uses both the proximity sensor and the force sensor(s) to provide an interface for an electronic system.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner. In various embodiments, the force sensors may be based on changes in capacitance and/or changes in resistance.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists).

In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110).

Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction.

In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 2:
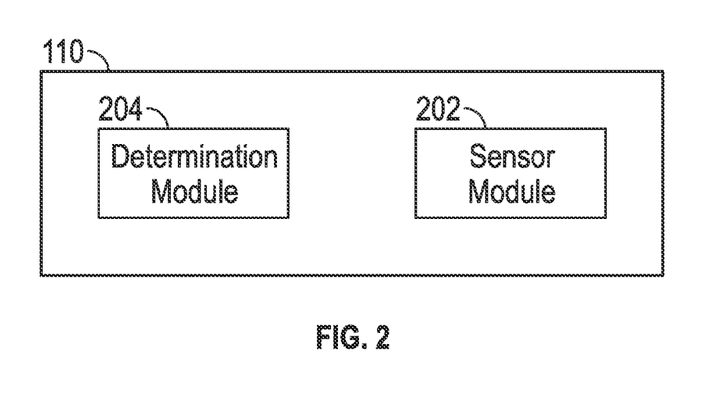
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensor electrodes associated with sensing region 120. Determination module 204 is configured to process the data, and to determine positional information and the force information for one or more input objects in the sensing region.

Figure 3:
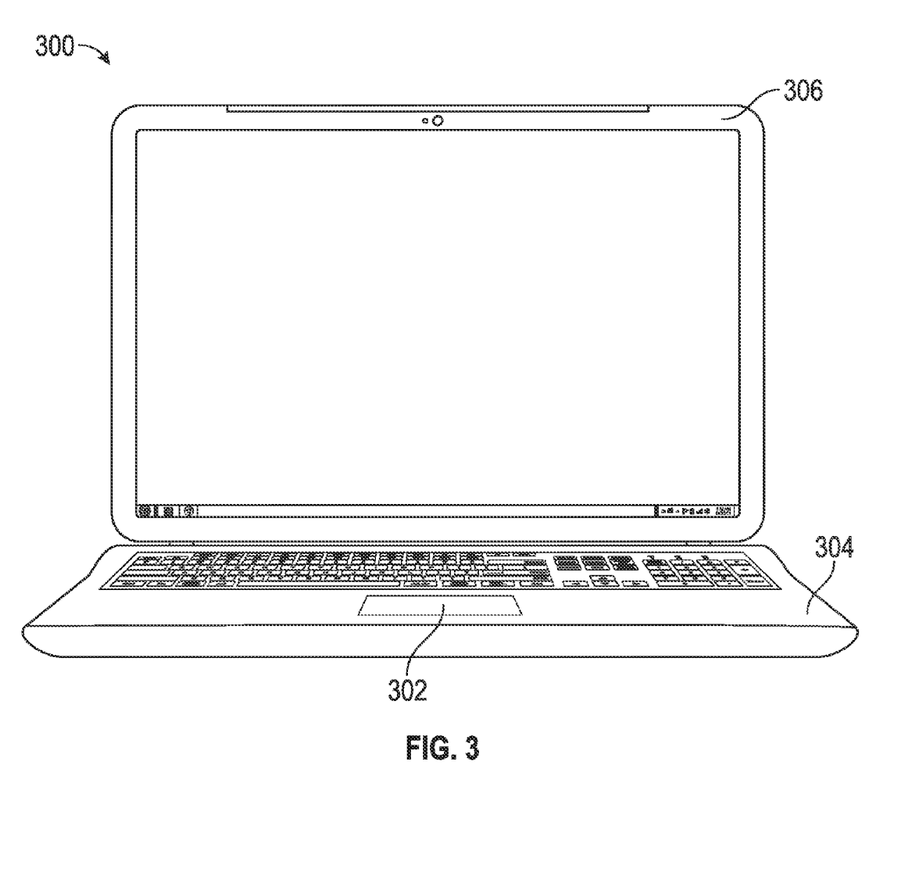
FIG. 3 is a perspective view of an electronic system illustrating conventional "B" and "C" covers in accordance with an embodiment.

Referring now to FIG. 3, the present invention may be employed in the context of an electronic system 300 such as a lap top or tablet computer, or any other electronic device employing a click pad 302. In the illustrated example, the click pad 302 may be installed into the keyboard deck 304, also referred to as the "C" cover. Those skilled in the art will appreciate that a conventional lap top computer includes the "C" cover 304, a "B" cover 306 (corresponding to the display), an "A" cover (hidden from view in FIG. 3) disposed on the opposite side of the display surface, and a "D" cover on the underside of the deck 304 (also hidden from view in FIG. 3). The term "top mount" refers to the notion that the click pad 302 may be installed from the top of the deck 304, as opposed installing the click pad from underneath the C cover (i.e., between the C and D covers.

Figure 4:
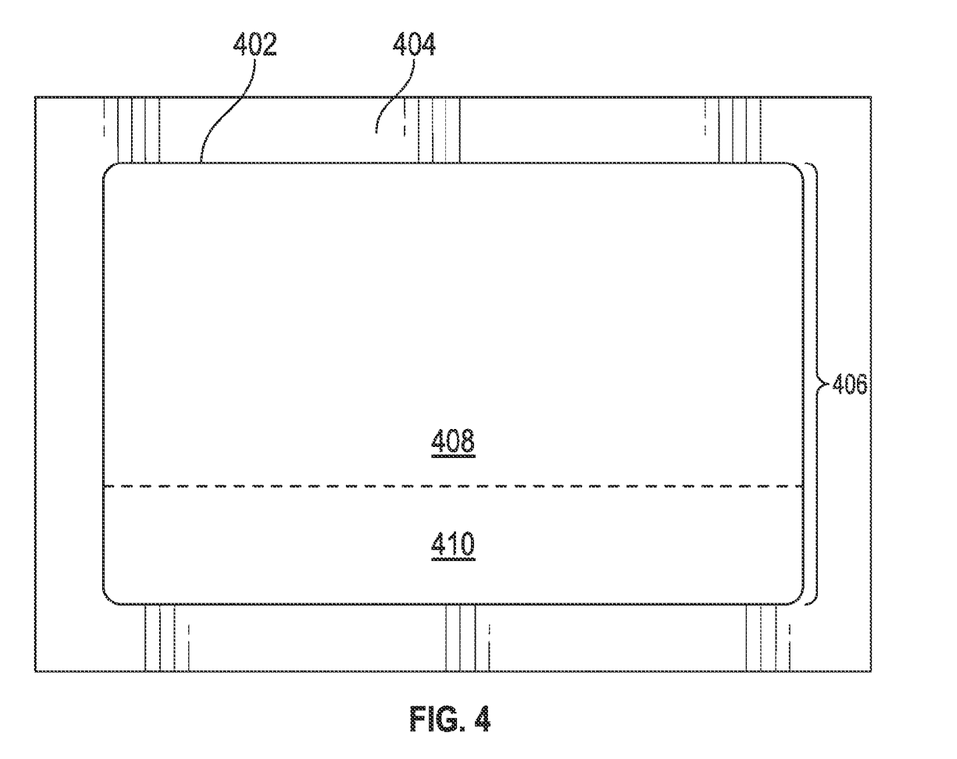
FIG. 4 is a top view of a click pad with a sensing surface having a lower region configured as a button zone in accordance with an embodiment.

FIG. 4 is a top plan view of a click pad module 402 installed in a (hidden from view in FIG. 4) formed in a keyboard deck 404 in accordance with an embodiment. More particularly, the click pad module 402 comprises a touch surface 406 configured to sense positional information for one or more input objects. In the illustrated embodiment, the touch surface 406 comprises a first zone 408 which does not deflect in response to applied force, and a second zone 410 configured to deflect downwardly in response to force applied by an input object in the second zone. It will be appreciated that the second zone is thus capable of detecting both positional and force information for objects interacting with the second zone 410.

Figure 5:
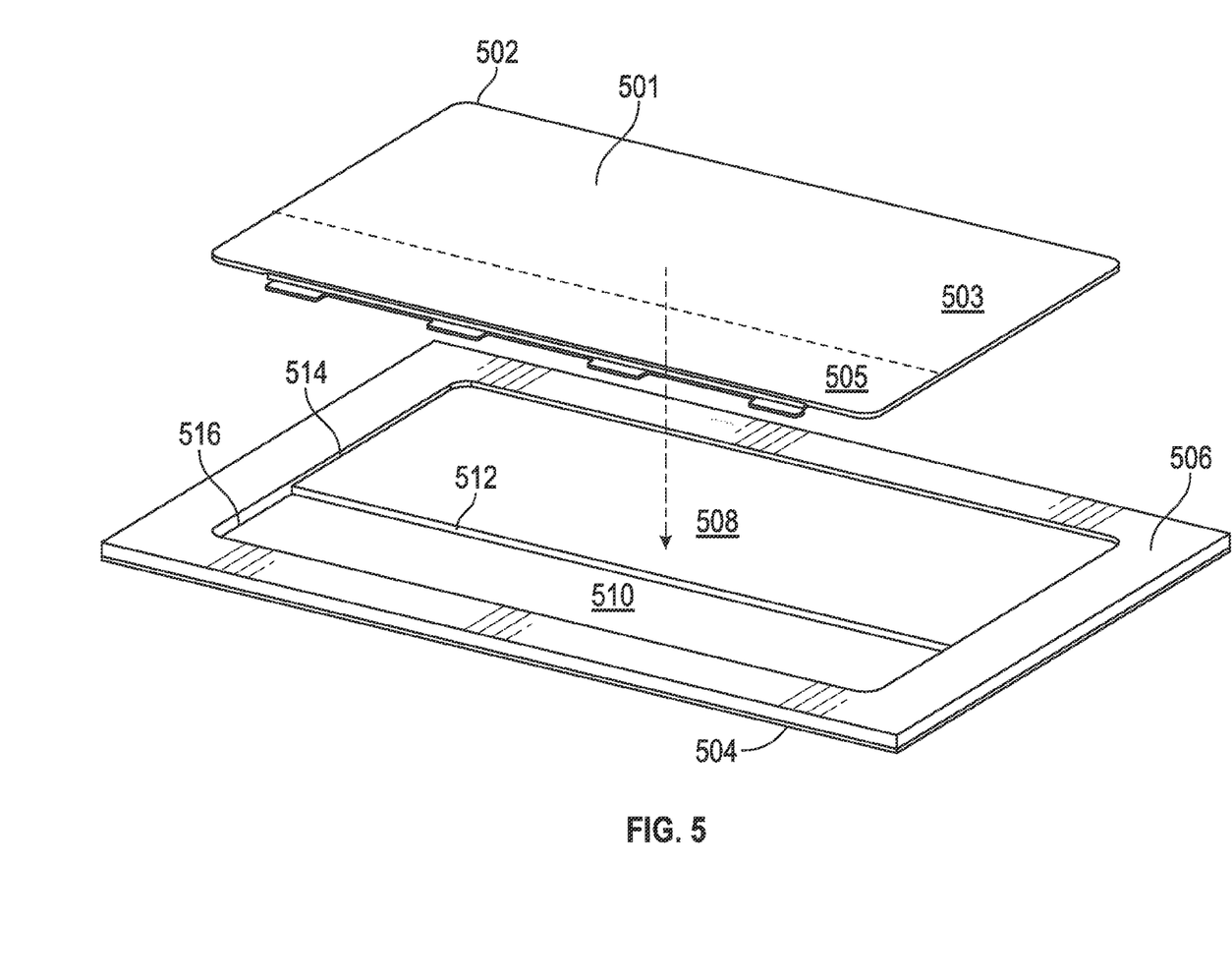
FIG. 5 is a perspective view of the click pad module configured to be installed into a bi-level basin within a keyboard deck of an electronic system in accordance with an embodiment.

FIG. 5 is a perspective view of a click pad module 502 configured to be installed into a bi-level basin 504. More particularly, the click pad module 502 comprises an input surface 501 including a first zone 503 and a second zone 505, wherein the second zone 505 functions as a button region, as described in greater detail below. The basin 504 comprises a first recessed level 508 having a vertical sidewall 514 extending between a deck 506 and the first recessed level 508. The basin 504 also includes a second recessed level 510 having a vertical sidewall 516 extending between the deck 506 and the second recessed level 510. When the module 502 is installed (e.g., using adhesive) within the basin 504, the second zone 505 deflects downwardly into the second recessed level 510 in response to force applied to the second recessed level by an input object.

Figure 6:
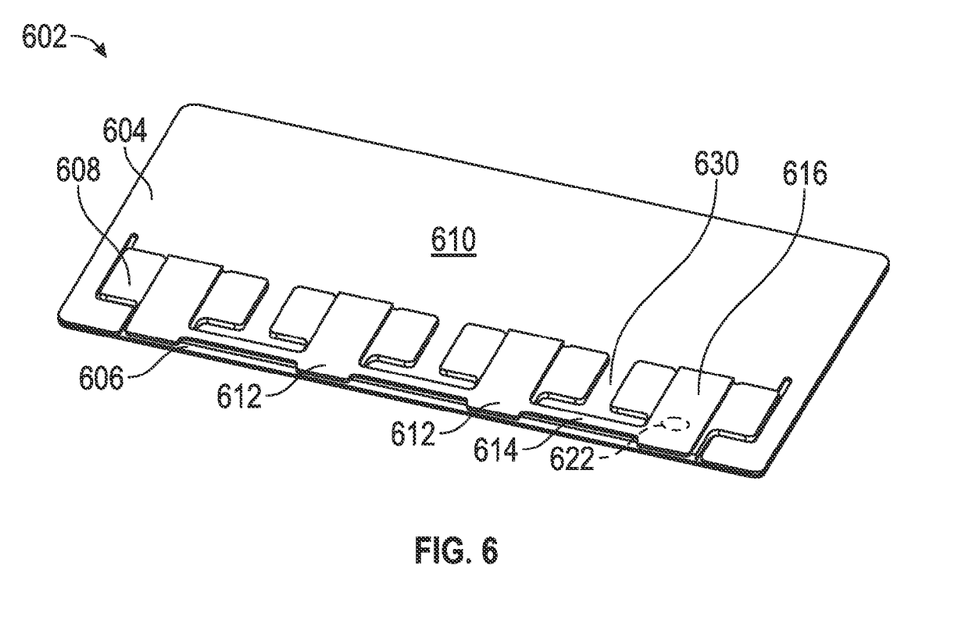
FIG. 6 is a perspective view of the underside of the click pad module, including a stiffener substrate having fingers extending parallel to and spaced part from the click pad in accordance with an embodiment.

FIG. 6 is a perspective detail view of the underside of a click pad module 602 generally analogous to the click pad module 502 shown in FIG. 5. More particularly, module 602 comprises a stiffener substrate or bracket 604 mounted (e.g., adhesively) to a capacitive sensor substrate 606. A component or control board 608 is interleaved between the bracket 604 and the capacitive sensor substrate 606.

With continued reference to FIG. 6 and again referring to FIG. 5, the bracket 604 includes a first region 610 configured to be secured (e.g., adhesively) to the first recessed level 508 of the basin 504. A plurality of fingers 612 interconnected by webbing 614 are configured to be secured (e.g., adhesively) to the second recessed level 510 of the basin 504. In the illustrated embodiment, the fingers 614 are parallel to and spaced apart (in the Z direction) from the first region 610. T-shaped spring arms 630 are essentially co-planar with the first region 610 and, when the click pad module 602 is installed in the basin, the T-shaped spring arms 630 extend (e.g., cantilevered) over the second recessed level 510.

In response to downward force applied by an input object, the second zone (button region) 505 and the T-shaped spring arms 630 deflect downwardly. A dome or tact switch 622 is disposed between a finger 612 and the second region 505 of the input surface 501 to detect the button press. In one embodiment, the switches 622 are mounted on a control board 608 interposed between the fingers 612 and the second region 505 of the input surface 501. An embossed junction 616 between each finger 612 and the first region 610 of the bracket 602 provides a restoring spring force.

Figure 7:
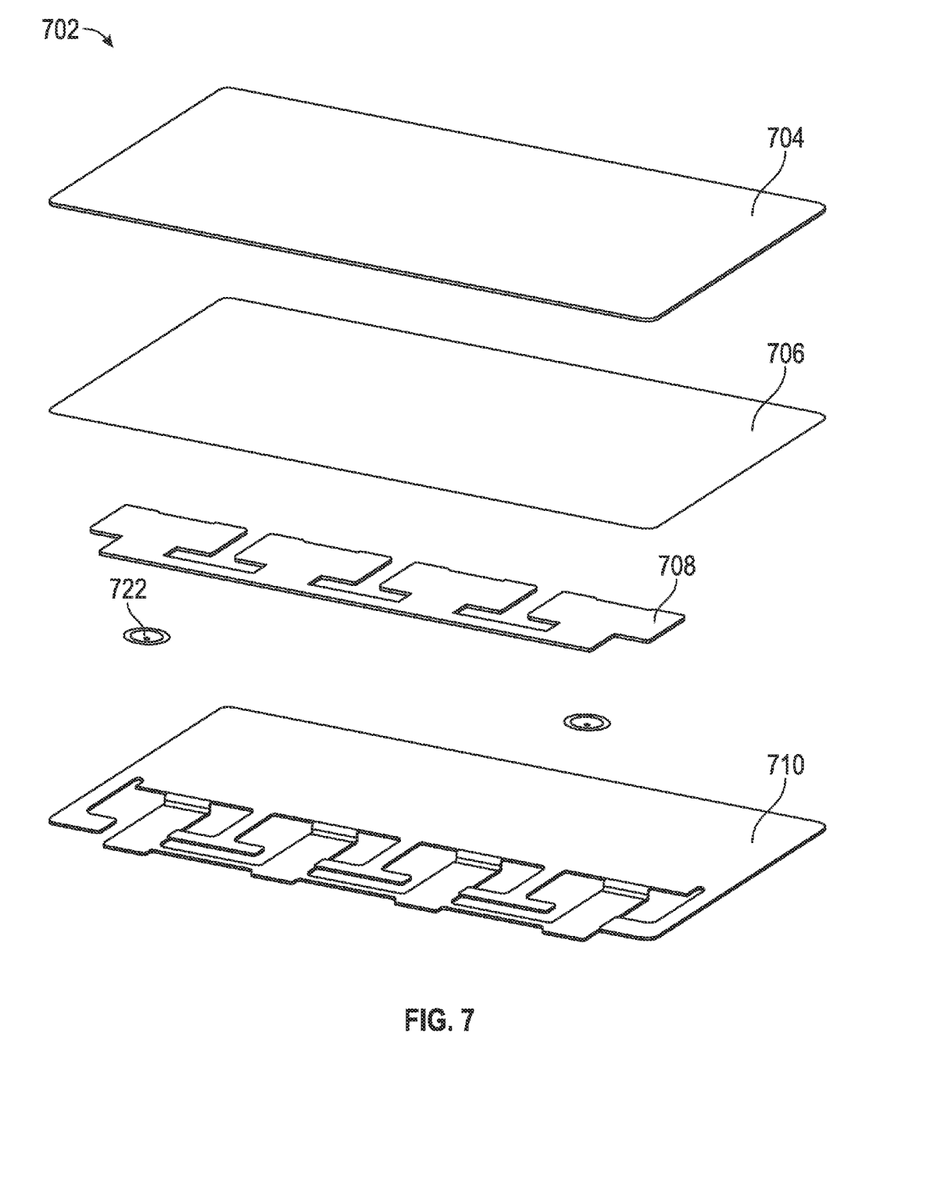
FIG. 7 is an exploded view of an input device including a face sheet, a sensor layer, a control board, and a stiffener bracket in accordance with an embodiment.

FIG. 7 is an exploded view of an input device 702 comprising a face sheet 704 (e.g., Mylar), a flexible capacitive sensor layer 704 (e.g. polyethylene terephthalate (PET)), a control board 708 (e.g., FR4 composite circuit board), and a stiffener bracket 710 (e.g., stamped metal). Respective dome switches 722 may be employed for one or more fingers 612 (FIG. 6) to provide tactile feedback to the user upon a button press. The capacitive sensor layer 706 and the control board 708 are communicatively coupled to a processing system (not shown) associated with the electronic system in which the click pad module 702 is mounted.

An input device is thus provided for use with an electronic system. The input device includes: a substantially planar input surface comprising a capacitive sensor layer configured to sense positional information for an input object, the input surface having a first zone and a second zone, wherein the second zone is configured to deflect in response to force applied to the second zone by the input object; a stiffener substrate having a first portion affixed to a bottom surface of the first zone, and at least one finger extending parallel to and spaced apart from the second zone; and an actuation mechanism disposed between the finger and the second zone.

In an embodiment, the input device further includes a face sheet affixed to a top surface of the input surface.

In an embodiment, the first zone does not deflect in response to force applied to the input surface.

In an embodiment, the capacitive sensor layer comprises a PET substrate.

In an embodiment, the input device comprises at least one of a force pad and a click pad for sensing force information for the input object.

In an embodiment, at least part of the second zone is configured to deflect downwardly relative to the first zone in response to applied force in the second zone.

In an embodiment, the first portion of the stiffening substrate and the at least one finger are formed from a single piece of metal.

In an embodiment, the input device further includes a control board disposed between the at least one finger and the second zone.

In an embodiment, the control board comprises an FR4 board.

In an embodiment, the control board comprises a processor communicatively coupled to the actuation mechanism and the capacitive sensor layer.

In an embodiment, a junction between the finger and the first portion of the stiffener substrate comprises an embossed step.

In an embodiment, a restoring force responsive to applied force is supplied by at least one of the finger and the actuation mechanism.

In an embodiment, the actuation mechanism comprises at least one of: a snap dome; a mechanical switch; an electronic switch; a resistive sensor; a capacitive sensor; a contact switch; a haptic sensor; a piezoelectric switch; a force sensor; a proximity switch; and a transcapacitive proximity sensor.

In an embodiment, the at least one finger comprises first and second fingers extending parallel to and space apart from the second zone, each comprising a respective actuation mechanism thereby forming respective first and second input buttons.

An input device is also provided for use with an electronic system of the type including a substantially planar deck having a basin extending downwardly from the deck and comprising first and second recessed planar regions. The input device includes: an input surface having a first zone substantially coextensive with the first recessed planar region of the basin and configured to sense position information of an input object, and a flexible second zone substantially contiguous with the first zone and overhanging the second recessed planar region of the basin and configured to sense force information of an input object; a stiffener having a first portion affixed to a bottom surface of the first zone, and at least one finger extending parallel to and space apart from the flexible second zone; and an actuation mechanism disposed between the at least one finger and the second zone.

In an embodiment, the basin comprises an aperture; the capacitive sensor layer comprises a sensor substrate having a plurality of sensor electrodes; and the input device further comprises a processing system communicatively coupled to the actuation mechanism and to the sensor electrodes through a connector aligned with the aperture.

In an embodiment, the sensor electrodes are disposed on a PET layer substrate, and the input device further comprises a face sheet affixed to a top surface of the input surface.

In an embodiment, at least part of the flexible second zone is configured to deflect downwardly relative to the first zone in response to applied force.

In an embodiment, the first portion of the stiffener and the at least one finger are formed from a single piece of metal, and further wherein the first zone of the input surface is adhesively secured to the first recessed planar region of the basin.

A clickable input device is provided for use with an electronic system. The clickable input device includes: an input surface comprising a capacitive sensor layer configured to sense positional information for an input object, and a contiguous bendable portion configured to sense force information for the input object; a face sheet affixed to the input surface; a stiffener substrate having a first portion affixed to a bottom surface of the capacitive sensor layer, and a plurality of arms extending parallel to and spaced apart from the second zone; respective switches disposed between each arm and the bendable portion; a control board disposed between the input surface and the stiffener substrate; and a processing system communicatively coupled to the control board and configured to determine positional and force information for the input object.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for use with an electronic system, comprising:

a substantially planar input surface comprising a capacitive sensor layer configured to sense positional information for an input object, the input surface having a first zone and a second zone, wherein the second zone is configured to deflect in response to force applied to the second zone by the input object;

a stiffener substrate comprising:
a first portion affixed to a bottom surface of the first zone,
at least one finger extending parallel to and spaced apart from the second zone, and
at least one T-shaped spring arm co-planar with the first portion; and an actuation mechanism disposed between the finger and the second zone.

2. The input device of claim 1, further comprising a face sheet affixed to a top surface of the input surface.

3. The input device of claim 1, wherein the first zone does not deflect in response to force applied to the input surface.

4. The input device of claim 3, wherein the capacitive sensor layer comprises a polyethelene terephthalate (PET) substrate.

5. The input device of claim 1, wherein the input device comprises at least one of a force pad and a click pad for sensing force information for the input object.

6. The input device of claim 1, wherein at least part of the second zone is configured to deflect downwardly relative to the first zone in response to applied force in the second zone.

7. The input device of claim 1, wherein the first portion of the stiffener substrate and the at least one finger are formed from a single piece of metal.

8. The input device of claim 1, further comprising a control board disposed between the at least one finger and the second zone.

9. The input device of claim 8, wherein the control board comprises a glass reinforced epoxy laminate (FR4) board.

10. The input device of claim 8, wherein the control board comprises a processor communicatively coupled to the actuation mechanism and the capacitive sensor layer.

11. The input device of claim 1, wherein a junction between the finger and the first portion of the stiffener substrate comprises an embossed step.

12. The input device of claim 11, wherein a restoring force responsive to applied force is supplied by at least one of the finger and the actuation mechanism.

13. The input device of claim 1, wherein the actuation mechanism comprises at least one of: a snap dome; a mechanical switch; an electronic switch; a resistive sensor; a capacitive sensor; a contact switch; a haptic sensor; a piezoelectric switch; a force sensor; a proximity switch; and a transcapacitive proximity sensor.

14. The input device of claim 1, wherein the at least one finger comprises first and second fingers extending parallel to and space apart from the second zone, each comprising a respective actuation mechanism thereby forming respective first and second input buttons.

15. An input device for use with an electronic system of the type including a substantially planar deck having a basin extending downwardly from the deck and comprising first and second recessed planar regions, the input device comprising:

an input surface having a first zone substantially coextensive with the first recessed planar region of the basin and configured to sense position information of an input object, and a flexible second zone substantially contiguous with the first zone and overhanging the second recessed planar region of the basin and configured to sense force information of an input object;
a stiffener substrate comprising:
    a first portion affixed to a bottom surface of the first zone,
    at least one finger extending parallel to and space apart from the flexible second zone, and
    at least one T-shaped spring arm co-planar with the first portion, wherein the T-shaped spring arm extends cantilevered over the second recessed planar region of the basin; and
an actuation mechanism disposed between the at least one finger and the second zone.

16. The input device of claim 15, wherein:
the basin comprises an aperture;
a capacitive sensor layer comprises a sensor substrate having a plurality of sensor electrodes; and
the input device further comprises a processing system communicatively coupled to the actuation mechanism and to the sensor electrodes through a connector aligned with the aperture.

17. The input device of claim 16, wherein the sensor electrodes are disposed on a polyethelene terephthalate (PET) layer substrate, and the input device further comprises a face sheet affixed to a top surface of the input surface.

18. The input device of claim 15, wherein at least part of the flexible second zone is configured to deflect downwardly relative to the first zone in response to applied force.

19. The input device of claim 15, wherein the first portion of the stiffener and the at least one finger are formed from a single piece of metal, and further wherein the first zone of the input surface is adhesively secured to the first recessed planar region of the basin.

20. A clickable input device for use with an electronic system, comprising:
an input surface comprising a capacitive sensor layer configured to sense positional information for an input object, and a contiguous bendable portion configured to sense force information for the input object;
a face sheet affixed to the input surface;
a stiffener substrate having a first portion affixed to a bottom surface of the capacitive sensor layer, and a plurality of arms extending parallel to and spaced apart from the bendable portion of input surface;
respective switches disposed between each arm and the bendable portion;
a control board interleaved between the capacitive sensor layer and the stiffener substrate; and
a processing system communicatively coupled to the control board and configured to determine positional and force information for the input object.

* * * * *

UNITED STATES PATENT AND TRADEMARK OFFICE
CERTIFICATE OF CORRECTION

| | | |
|---|---|---|
| PATENT NO. | : 9,652,057 B2 | Page 1 of 1 |
| APPLICATION NO. | : 14/588045 | |
| DATED | : May 16, 2017 | |
| INVENTOR(S) | : Yeh-Cheng Tan et al. | |

It is certified that error appears in the above-identified patent and that said Letters Patent is hereby corrected as shown below:

On the Title Page

Item (57) ABSTRACT, beginning on Line 2 and ending on Line 3, the word "comprising" should read -- including --.

Signed and Sealed this
Eighth Day of May, 2018

Andrei Iancu
*Director of the United States Patent and Trademark Office*